United States Patent [19]

Nemazi

[11] 4,398,511
[45] Aug. 16, 1983

[54] ADJUSTABLE ROOF ENGINE SWIRL INLET PORT

[75] Inventor: John E. Nemazi, Troy, Mich.

[73] Assignee: General Motors Corporation, Detroit, Mich.

[21] Appl. No.: 295,798

[22] Filed: Aug. 24, 1981

[51] Int. Cl.³ .............................................. F02B 31/00
[52] U.S. Cl. ................................ 123/188 M; 123/306
[58] Field of Search ............... 123/188 R, 188 M, 306

[56] References Cited

U.S. PATENT DOCUMENTS

| 4,015,577 | 4/1977  | Elsbett et al. | 123/188 M |
| 4,207,854 | 6/1980  | Alford et al.  | 123/188 M |
| 4,240,387 | 12/1980 | Motosugi et al.| 123/52 M  |
| 4,256,062 | 3/1981  | Schäfer        | 123/188 M |
| 4,320,725 | 3/1982  | Rychlik        | 123/188 M |

FOREIGN PATENT DOCUMENTS

| 464617  | 8/1928  | Fed. Rep. of Germany | 123/188 M |
| 2914961 | 11/1980 | Fed. Rep. of Germany | 123/188 M |
| 53-1712 | 1/1978  | Japan                | 123/188 M |
| 60523   | 2/1948  | Netherlands          | 123/306   |

Primary Examiner—Craig R. Feinberg
Assistant Examiner—W. R. Wolfe
Attorney, Agent, or Firm—Robert J. Outland

[57] ABSTRACT

Control of cylinder air swirl in an internal combustion engine is provided by a swirl generating inlet port having a movable vane forming a ceiling for at least the port swirl portion to vary the cross-sectional area of the port swirl portion surrounding the valve axis. Various possible vane configurations are disclosed.

5 Claims, 11 Drawing Figures

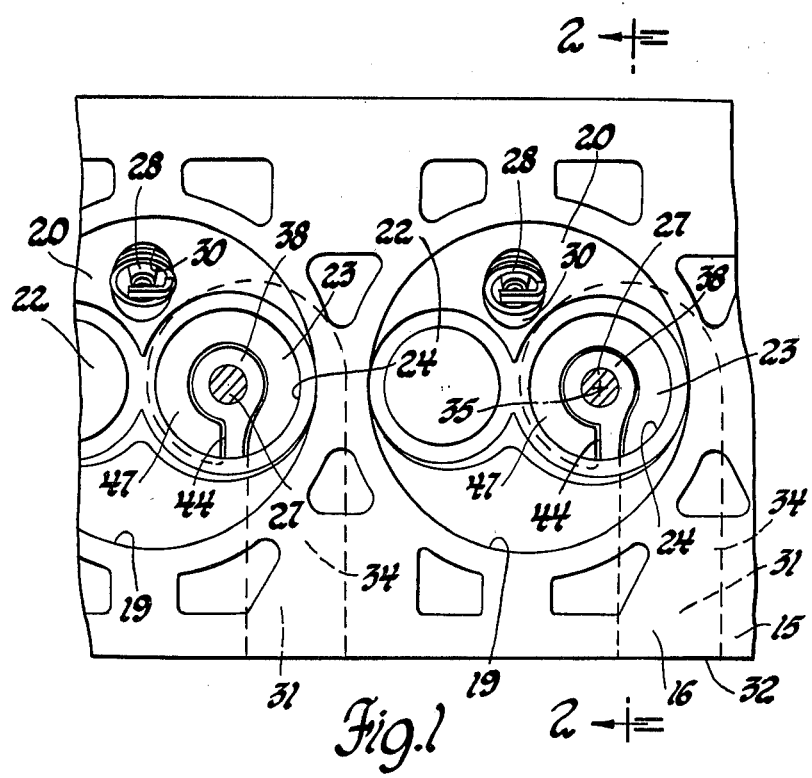
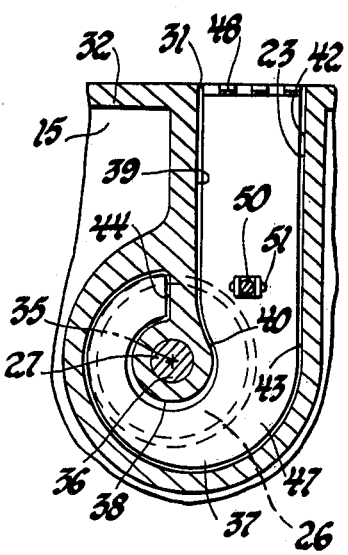
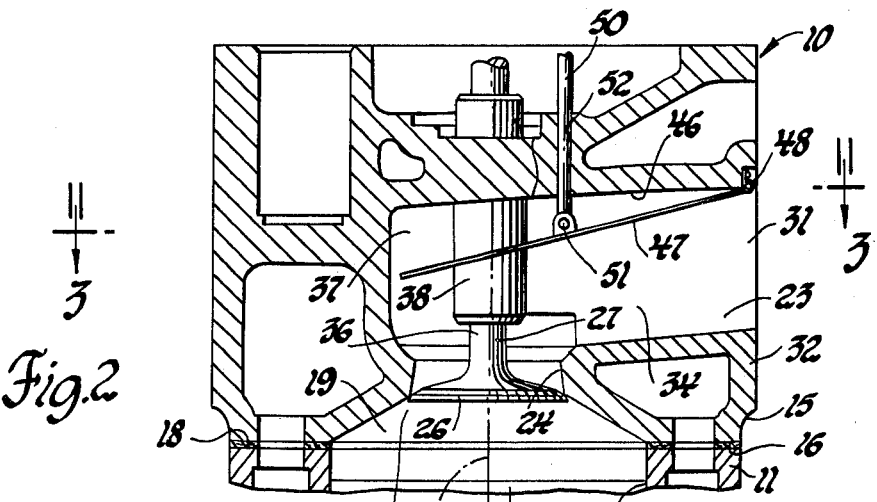
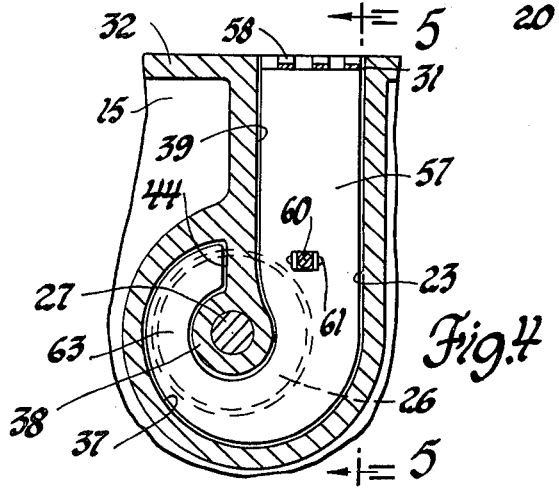
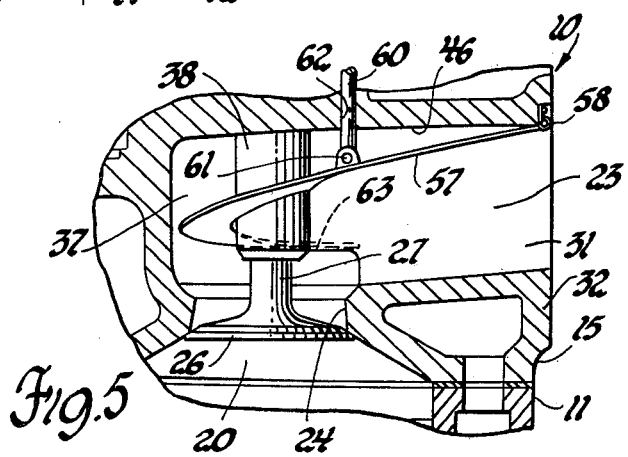

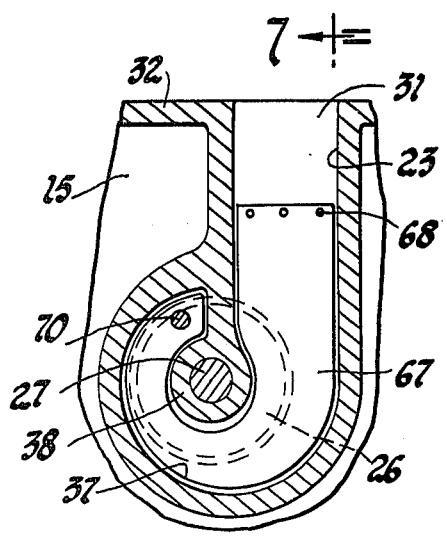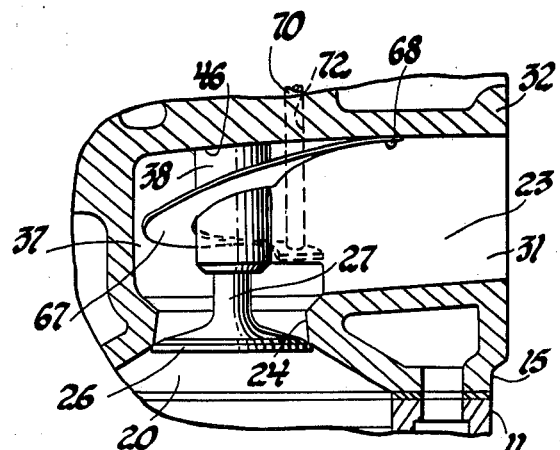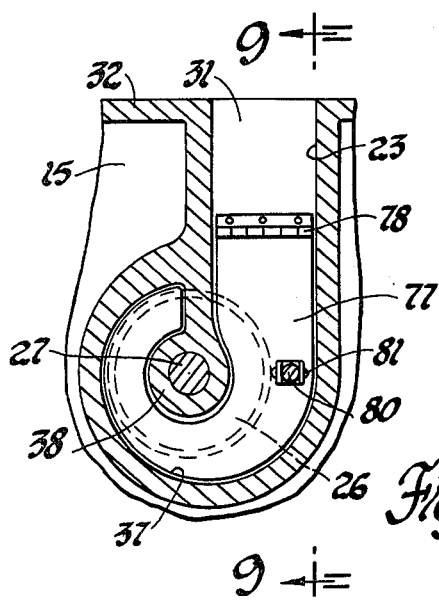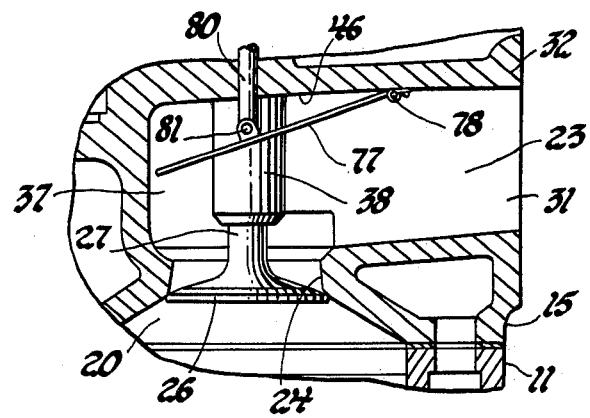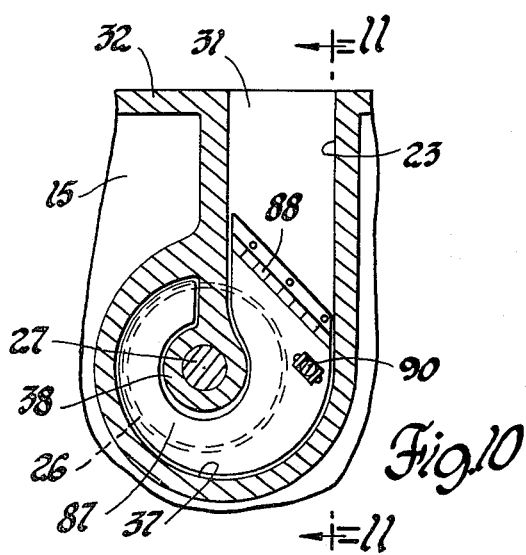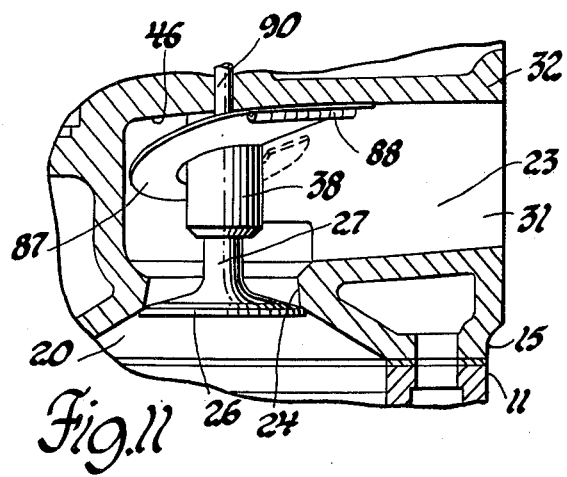

A # ADJUSTABLE ROOF ENGINE SWIRL INLET PORT

TECHNICAL FIELD

This invention relates to intake systems for internal combustion engines and more particularly to variable area swirl generating cylinder inlet ports for such engines.

BACKGROUND

U.S. patent application Ser. No. 238,492 filed Feb. 26, 1981 and assigned to the assignee of the present invention, discloses the concept of varying the cross-sectional area of the spiroid swirl generating portion of a swirl generating engine cylinder inlet port in order to vary the amount of in-cylinder swirl obtained at differing engine speeds and cylinder air flow rates. This concept is exemplified by a variable area port arrangement which utilizes a flexible inner side wall that is movable to adjust the effective port area in a desired manner.

SUMMARY OF THE INVENTION

The present invention provides an alternative manner of carrying out the variable area swirl port concept of patent application Ser. No. 238,492. This is accomplished in a highly effective and practical way by providing an adjustable wall baffle or vane attached to and forming the ceiling of a swirl generating inlet port. The vane or gaffle constitutes movable wall means which is downwardly adjustable, at least in the spiral swirl generating portion of the port, so as to vary the height of selected portions of the port. This varies the cross-sectional flow area thereby controlling the discharge of inlet gases through the port throat and providing an effective control for cylinder swirl at varying air flows.

These and other features and advantages of the invention will be more fully understood from the following description of certain preferred embodiments taken together with the accompanying drawing.

BRIEF DRAWING DESCRIPTION

In the drawings:

FIG. 1 is a partial lower plan view of the cylinder head portion of an internal combustion engine having variable area port means in accordance with the invention;

FIG. 2 is a fragmentary transverse cross-sectional view through a cylinder of the engine taken in the plane generally indicated by the line 2—2 of FIG. 1;

FIG. 3 is a cross-sectional view through one of the swirl inlet ports from the plane generally indicated by the line 3—3 of FIG. 2;

FIG. 4 is a cross-sectional view similar to FIG. 3 but showing an alternative embodiment of port baffle arrangement;

FIG. 5 is a transverse cross-sectional view through the inlet port from the plane generally indicated by the line 5—5 of FIG. 4;

FIG. 6 is a cross-sectional view similar to FIG. 4 showing another embodiment of baffle means;

FIG. 7 is a transverse cross-sectional view through the port from the plane generally indicated by the line 7—7 of FIG. 6;

FIG. 8 is a cross-sectional view similar to FIG. 6 showing another baffle arrangement;

FIG. 9 is a transverse cross-sectional view through the port from the plane generally indicated by the line 9—9 of FIG. 8;

FIG. 10 is a cross-sectional view similar to FIG. 8 and illustrating still another roof mounted port baffle arrangement, and FIG. 11 is a transverse cross-sectional view through the port from the plane generally indicated by the line 11—11 of FIG. 10.

DESCRIPTION OF THE ILLUSTRATED EMBODIMENTS

Referring first to FIGS. 1-3 of the drawings, numeral 10 generally indicates an internal combustion engine having a cylinder block 11 that defines a plurality of cylinders 12 in which there are reciprocably disposed pistons 14. A cylinder head 15 is provided having a lower surface 16 seated on an upper surface 18 of the cylinder block to close the ends of the cylinders 12.

The bottom side of the cylinder head is provided with a plurality of combustion chamber recesses 19 which are aligned one with each of the cylinders in the cylinder block and cooperate with the pistons to form enclosed combustion chambers 20. For each of the cylinders, the cylinder head is provided with an exhaust port, not shown, opening to its respective combustion chamber to receive exhaust gases therefrom and capable of being closed by an exhaust valve 22 in conventional fashion.

A swirl generating inlet port 23 formed in accordance with the invention is also provided in the cylinder head for each of the engine cylinders. Each inlet port 23 opens to its respective combustion chamber recess 19 at an outlet opening throat portion 24 adapted to be closed by the head 26 of an inlet valve 27. The exhaust and inlet port openings are located adjacent one another in the combustion chamber recesses 19. A spark plug 28 is located to one side of and between the two port openings, on one side of each combustion chamber recess, a suitable threaded opening 30 being provided for the purpose of receiving the spark plug.

Each inlet port 23 includes the previously mentioned throat portion 24 which is of generally circular cross section and constitutes the outlet opening of the port into the engine cylinder or combustion chamber. An entrance portion 31 of the port is spaced upstream from the throat portion and opens through a side wall 32 of the cylinder head. The side wall 32 is adapted to support an intake manifold, not shown, to supply air-fuel mixture to all the inlet ports of the cylinder head.

Between the distal parts of the entrance and throat portions, the inlet port 23 defines a fluid flow passage 34 extending downstream through the entrance portion 31 to one side of and around the axis 35 on which the stem 36 of the inlet valve 27 is reciprocably supported. Passage 34 blends into the throat portion in a swirl portion 37 having a spiral configuration of decreasing radius about the valve axis. A valve guide boss 38 surrounding the valve axis and supporting the valve stem terminates in the flow passage well into the lower portion of the passage, but substantially upstream of the throat portion, thus providing a center around which portions of the incoming air flow are caused to swirl.

The port 23 further includes an inside wall 39 which extends from the entrance portion, preferably in a straight or smoothly curved configuration, to an essentially tangential intersection with the outer surface of the guide boss at a point 40 laterally adjacent the valve axis. An outside wall 42 extends from the entrance portion in generally parallel relationship to the inside wall to a point 43 approximately opposite the point 40 at the intersection of the inside wall with the guide boss. From point 43, the outside wall curves around the valve axis and the guide boss in a spiral of decreasing radius. This radius reaches a minimum only slightly larger than the radius of the port throat at or before the port terminus 44 where the outside wall has curved around to an intersection with the side of the inside wall 39 for the port.

Each inlet port 23 further includes an upper wall or roof 46 lying generally opposite the port throat 24. Roof 46 extends between the inner and outer side walls 39, 42 respectively to close the upper portion of the port and define an upper limit or bound for the gas flow path enclosed by the inlet port.

In accordance with the invention, each inlet port is further provided with a movable wall in the form of a baffle or vane 47 which is preferably secured to the port roof at the upstream end of the vane and is movable in its downstream portions toward or away from the port roof. The movable vane thus defines a ceiling over its extent that defines a varying upper bound for the port flow path so as to thus vary the flow area in various portions of the port as desired.

In the embodiment of FIGS. 1–3, the vane 47 comprises a flat stiff metal sheet material, such as metal, which closely simulates the form of the roof 46 of the port over its complete extent. However, clearance is provided around its edges to permit movement of the vane in the port without striking the port side walls and valve guide boss. Vane 47 is secured at the port entrance by a hinge 48 and is adjustable by means of a rod 50 that is pivotally connected to the vane at 51, extending up through an opening 52 in the cylinder head 15 for connection with external adjusting means, not shown.

In operation, air or air-fuel mixture is periodically drawn into the engine cylinders on the intake strokes of their respective pistons, at which time their respective inlet valves 27 are opened. The passage of the air or gas mixture through the swirl portion 37 of the port and the relative positioning of the port with respect to the cylinder cause the entering gas to form a swirling field of fluid in the combustion chamber which persists during the subsequent compression and combustion events.

In order to maintain or vary the amount of swirl developed in the cylinders at various engine speeds and at various intake air flow rates as may be established by throttling the engine air intake, the position of the vane 47 may be adjusted by pivoting the vane toward or away from the port roof 46 through moving the rod 50 in a vertical direction as shown in FIG. 2. Pivoting the vane downwardly causes a progressive reduction in the cross-sectional flow area of the port as it extends from the entrance portion to the initial part of the swirl portion 37. This area reduction can be used to accelerate the gas flow rate in spite of an overall reduction of volumetric gas flow into the cylinder and thus allow the maintenance of desired swirl rates in the engine combustion chamber at lower cylinder air flows. Thus, movement of the vane toward or away from the roof 46 can be utilized to control to some extent the amount of swirl developed in the engine combustion chamber in accordance with operator desires or engine operating conditions.

FIGS. 4–11 disclose various alternative embodiments of variable swirl inlet ports in which the constructions are identical to those of the embodiments of FIGS. 1–3 except for the construction and arrangement of the vane and its actuating and securing devices. Accordingly in these later embodiments, like reference numerals are utilized for identifying components equivalent to those of the first described embodiment.

In the embodiment of FIGS. 4 and 5, the inlet port 23 is provided with a vane 57. The vane 57 is similar to the vane 47 described with regard to the first described embodiment in that vane 57 is formed of a stiff sheet material such as metal, is secured at the entrance portion of the port by a hinge 58 and is adjustable toward and away from the port roof 46 by a rod 60 pivotally connected to the vane at 61 and extending through an opening 62 and the cylinder head. Vane 57 differs from that previously described in that the portion extending into the port spiral swirl portion 37 forms a sprial ceiling portion 63 which is downwardly curved with respect to the flat portion of the vane extending through the port entrance portion 31. This downwardly spiraling configuration of the vane is somewhat more effective in promoting accelerated swirl at all flow rates of the inlet port. However, depending upon the amount of downward deformation, some interference with the maximum flow capability of the port may be encountered.

The embodiment of FIGS. 6 and 7 utilizes a vane 67 formed of flexible sheet material securely fastened at 68 to the port roof midway of the entrance portion. A rod 70 extending through a cylinder head opening 72 engages the top of the flexible vane so as to deform it downwardly in spiral fashion a desired amount to control port air swirl. The vane is preferably made resilient so that it returns of its own accord to an upper roof engaging position when the rod 70 is withdrawn.

In the embodiment of FIGS. 8 and 9, a flat stiff vane 77 is provided which is similar to the vane arrangement of FIGS. 1–3 except that the vane is shorter, being pivotally fastened by a hinge 78 to the roof of the port midway of the entrance portion. A rod 80 pivotally connected at 81 to the vane is utilized to control the vane position in the manner previously described.

Finally, the embodiment of FIGS. 10 and 11 provides an alternative arrangement of a stiff flat vane 87 which is pivotally secured to the port roof near the beginning of the swirl portion 37 by a hinge 88 which extends diagonally across the port roof portion. The arrangement is such that, as the vane is moved downwardly by its rod 90, the position of the hinge 88 causes the lowest portion of the vane to be positioned further downstream in the spiral portion of the port than in the previously described flat vane embodiments of FIGS. 1–3 and 8 and 9.

It should be apparent that the various embodiments of ceiling vanes described have various potential capabilities in the adjustment of port swirl developing flow characteristics. These arrangements are but exemplary of the various modifications which might be made in the concept of an adjustable roof variable area swirl developing port for an internal combustion engine as embodied in the present invention. Accordingly, it is intended that the invention not be limited to the various described embodiments but that it have the full scope permitted by the language of the following claims.

The embodiments of the invention in which an exclusive property or privilege is claimed are defined as follows:

1. An internal combustion engine including means defining a cylinder and an inlet port communicating with the cylinder, said port having
   a throat opening to the cylinder,
   a poppet valve having a stem and head controlling the throat opening and having an axis extending through the throat,
   a swirl portion connecting with the throat and curved about the valve axis upstream of the throat,
   an entrance portion connecting with the swirl portion and extending upstream generally tangentially from a point adjacent the valve axis, and
   a movable wall lying generally opposite the throat and comprising a ceiling extending at least partially about the valve stem and over a substantial part of the port swirl portion and defining over its extent an upper bound of the port flow area, said wall being movable, at least in the swirl portion of the port, between positions axially nearer to and farther from the throat to vary the port height along adjacent portions of the path of gas flow and thereby vary the rate of gas flow through the various portions of the throat and the resulting level of charge swirl created in the cylinder.

2. An internal combustion engine including means defining a cylinder and an inlet port communicating with the cylinder, said port having
   a throat opening to the cylinder,
   a poppet valve controlling the throat opening and having an axis extending through the throat,
   a swirl portion connecting with the throat and curved about the valve axis upstream of the throat,
   an entrance portion connecting with the swirl portion and extending upstream generally tangentially from a point adjacent the valve axis,
   said port swirl and entrance portions being partially defined by a roof formed by a side of the port lying generally opposite the location of the throat, and
   a movable vane in the port having an upstream end fixed against the roof, the vane extending downstream from the fixed end over at least part of the port swirl portion, said vane covering a substantial portion of the port roof to form a ceiling defining over its extent an upper bound of the port flow area, said vane being movable downstream of its fixed end between positions nearer to and farther from the roof to establish the port height in at least the part of the port swirl portion under said vane to thereby vary the rate of gas flow through various parts of the throat and the resulting level of charge swirl created in the cylinder.

3. An engine as defined in claim 2 wherein said vane is of flat relatively stiff construction and is pivotally connected with the roof at its fixed end.

4. An engine as defined in claim 2 wherein said vane is formed at least in a portion extending over the swirl portion of the port with a configuration curving downwardly in the direction from the entrance portion toward the throat.

5. An engine as defined in claim 4 wherein said vane is of relatively stiff construction and is pivotally connected with the roof at its fixed end.

* * * * *